United States Patent [19]
Ziolo

[11] Patent Number: 5,358,659
[45] Date of Patent: Oct. 25, 1994

[54] MAGNETIC MATERIALS WITH SINGLE-DOMAIN AND MULTIDOMAIN CRYSTALLITES AND A METHOD OF PREPARATION

[75] Inventor: Ronald F. Ziolo, Webster, N.Y.

[73] Assignee: Xerox Corporation, Stamford, Conn.

[21] Appl. No.: 910,805

[22] Filed: Jul. 9, 1992

[51] Int. Cl.⁵ .................. H01F 1/06; H01F 1/20; H01F 1/28

[52] U.S. Cl. .................. 252/62.54; 252/62.56; 430/106.6; 427/128; 427/222; 428/403; 428/407; 428/900

[58] Field of Search .............. 252/62.53, 62.54, 62.56; 427/127, 128, 130, 212, 215, 256, 222; 428/403, 407, 900; 430/106.6

[56] References Cited

U.S. PATENT DOCUMENTS

| | | |
|---|---|---|
| 3,654,161 | 4/1972 | Geus . |
| 3,867,299 | 2/1975 | Rohatgi . |
| 3,977,984 | 8/1976 | Roberts . |
| 4,022,701 | 5/1977 | Sawa et al. . |
| 4,474,866 | 10/1984 | Ziolo .................. 430/106.6 |
| 4,622,281 | 11/1986 | Imai et al. . |
| 4,758,275 | 7/1988 | Yubakami et al. . |
| 4,760,009 | 7/1988 | Larson . |
| 4,855,079 | 8/1989 | Wyman .................. 252/62.52 |
| 4,873,102 | 10/1989 | Chang et al. .................. 427/130 |
| 5,047,307 | 9/1991 | Landa et al. . |
| 5,110,624 | 5/1992 | Noble et al. .................. 252/62.54 |
| 5,114,477 | 5/1992 | Mort et al. . |

FOREIGN PATENT DOCUMENTS

| | | |
|---|---|---|
| 0055065 | 6/1982 | European Pat. Off. . |
| 0757573 | 8/1980 | U.S.S.R. . |

OTHER PUBLICATIONS

English language abstract of Soviet 0 757 573, Aug. 23, 1980.

Primary Examiner—Prince Willis, Jr.
Assistant Examiner—Alan D. Diamond
Attorney, Agent, or Firm—Finnegan, Henderson, Farabow, Garrett & Dunner

[57] ABSTRACT

The disclosure relates to a method of forming magnetic materials having tunable magnetic properties and the magnetic materials formed thereby. The magnetic materials contain both single-domain and multidomain particles and have high initial permeability while maintaining coercivity and remanence in the material.

13 Claims, 5 Drawing Sheets

MAGNETIC MATERIALS WITH SINGLE-DOMAIN AND MULTIDOMAIN CRYSTALLITES AND A METHOD OF PREPARATION

BACKGROUND OF THE INVENTION

1. Field of the Invention

The present invention relates to the direct preparation of premicronized low optical density magnetic material from submicron ion exchange resin using hollow fiber ultrafiltration technology.

The present invention further relates to magnetic materials having tunable magnetic properties, and more specifically, the present invention relates to magnetic materials containing both single-domain and multidomain particles. More particularly, the present invention relates to magnetic materials having high initial permeability while maintaining coercivity and remanence in the pigment.

The present invention also relates to a method for making low optical density magnetic fluids containing both single-domain and multidomain particles. More specifically, the invention relates to a method for the preparation of colored magnetic particles and ferrofluids using various colorants, dyes or pigments.

Finally, the invention relates to xerographic magnetic liquid toners, colored xerographic magnetic liquid toners and liquid ink compositions and methods of preparation thereof.

2. Description of Related Art

In standard one and two component xerographic and other magnetic imaging systems, the magnetic pigment used has both a remanence and coercivity that enables the pigment to function in the applied field, Due to the remanence and coercivity properties of the magnetic pigment, prior art materials required high weight or volume loading of the pigment in order to get an initial permeability high enough to make the material useful.

Magnetic pigments having high initial permeability are desirable because they allow for substantially lower pigment loadings which in turn improves the rheological properties of a toner or developer or improves the optical properties of, for example, a single component highlight color or color clean machine subsystem.

Prior Art superparamagnetic (SPM) materials for use as magnetic pigments provide the desired high initial permeability. These materials are not entirely satisfactory as they have no coercivity or remanence which are necessary for certain applications, i.e. any application requiring a memory. Such superparamagnetic materials have no memory in that, they are only magnetic in the presence of a field and have no net magnetism outside the field.

Ferrofluids which contain superparamagnetic materials as described above, are recognized within the prior art for a number of applications, including exclusion seals for computer disc drives, seals for bearings, for pressure and vacuum sealing devices, for heat transfer and damping fluids in audio speaker devices and in inertia damping. Typical prior art superparamagnetic materials such as those described by Wyman in U.S. Pat. No. 4,855,079 are coated particles which are in an organic based carrier material. More specifically, this patent discloses a superparamagnetic material which is formed by the precipitation of the magnetic particles (magnetite). These particles are subsequently coated with an oleic acid surfactant. The coated particles were eventually suspended in an organic dispersing agent.

The use of dispersing agents or surfactants is a problem in that the right or enabling surfactant must be found empirically. Furthermore, the surfactant may degrade or cause adverse chemical reactions in the magnetic fluid during its application.

A method of forming dry magnetic particles by precipitation of a magnetic oxide in an ion exchange resin is discussed and exemplified by Ziolo in U.S. Pat. No. 4,474,866, which is incorporated herein by reference. According to the method employed, an ion exchange resin is loaded with a magnetic ion. The resin is then recovered and dried. The loaded resin does not contain single-domain and multidomain crystallites internal and external to the resin bead, respectively. The magnetic polymer resin must then be micronized to form a fine magnetic powder. The micronization step is a time and energy intensive process. The dry magnetic particles formed according to Ziolo, U.S. Pat. No. 4,474,866, like other typical prior art materials, could not be directly suspended in an aqueous medium to form a stable colloid.

None of the heretofor known prior art magnetic materials contain both single-domain and multidomain crystallites. Domain as used herein is described for example in C. P. Bean and J. D. Livingston, *J. Appl. Physics* 30, 120s (1959) and B. D. Cullity, *Introduction to Magnetic Materials*, Addison-Wesley Publishing Co., MA, (1972), both of which are incorporated herein by reference. The presence of both single-domain and multidomain crystallites provides the ability to tune the magnetic properties to match the desired use for the material. By varying the amount of single-domain and multidomain crystallites with respect to one another it is possible to provide a material whereby the properties of high initial permeability, remanence and coercivity may be varied relative to one another.

SUMMARY OF THE INVENTION

It is therefore an object of the present invention to overcome these and other difficulties encountered in the prior art.

Another object of the present invention is to provide a magnetic material having variable magnetic properties.

Another object of the present invention is to provide magnetic materials containing both single-domain and multidomain particles.

A further object of the present invention is to provide magnetic materials having high initial permeability due to the presence of a superparamagnetic component, while maintaining coercivity and remanence.

Still another object of the present invention is to provide a method for making magnetic materials containing both single-domain and multidomain particles by precipitating the magnetic material into a polymeric matrix.

A further object of the present invention is to provide a low optical density ferrofluid having tunable magnetic properties.

A further object of the present invention is to provide a method of making a colored particle or ferrofluid having tunable magnetic properties using various colorants, pigments, dyes or brightly colored metal chelates.

The magnetic materials according to the present invention overcome the prior art drawbacks associated with the use of organic dispersing agents. In addition, the magnetic materials of the present invention achieve coercivity and remanence while maintaining high initial permeability.

These and other objects are accomplished by forming magnetic particles in an ion exchange resin. The method according to the invention allows the particle formation without regrinding. A high quality submicron low optical density material is prepared directly from an ion exchange resin using ultrafiltration technology. The generated material is the first two-component low optical density system observed and comprises single-domain and multidomain $(\gamma)$-$Fe_2O_3$ crystallites inside and outside of the resin beads, respectively.

Additional objects and advantages of the invention will be set forth in part in the description which follows, and in part will be apparent from the description, or may be learned by practice of the invention. The objects and advantages of the invention will be realized and attained by means of the elements and combination particularly pointed out in the appended claims.

DESCRIPTION OF THE PREFERRED EMBODIMENTS

To prepare a premicronized magnetic resin, it is necessary to use a submicron ion exchange resin as the host matrix. Examples of such a matrix include a submicron sulfonated polystyrene resin, designated SSPR for the purposes of the present invention, which is available from Rohm & Haas in emulsion form. Additional submicron resins which would be appropriate for use in the present invention include any submicron resins which do not interfere with the characteristics of the magnetic material disclosed herein.

The ultrafiltration technique is used in place of conventional ion exchange techniques to process the resin because of the very small size of the resin beads. The submicron resin beads may be suspended in an aqueous colloidal form prior to incorporation of the magnetic ions, thus resulting in a stable colloidal dispersion of the resin and particles. Alternatively, the resin beads may be removed and dried to form a dry product. Ions which can be incorporated into the resin beads to form both single-domain and multidomain magnetic particles include: those derivable from transition metal ions, such as iron, cobalt, nickel, manganese, vanadium, chromium, rare earths and the like. These ions generally exist in the form of chlorides of the metal involved such as ferrous chloride, ferric chloride, copper chloride, nickel chloride, and the like. The corresponding iodides, bromides and fluorides may also be suitable. Other sources of the cation include for example soluble salts such as water soluble iron acetate, nitrate, perchlorate, sulfate, thiocyanate, thiosulfate, nickel acetate, cobalt acetate and the like.

Figure 1:
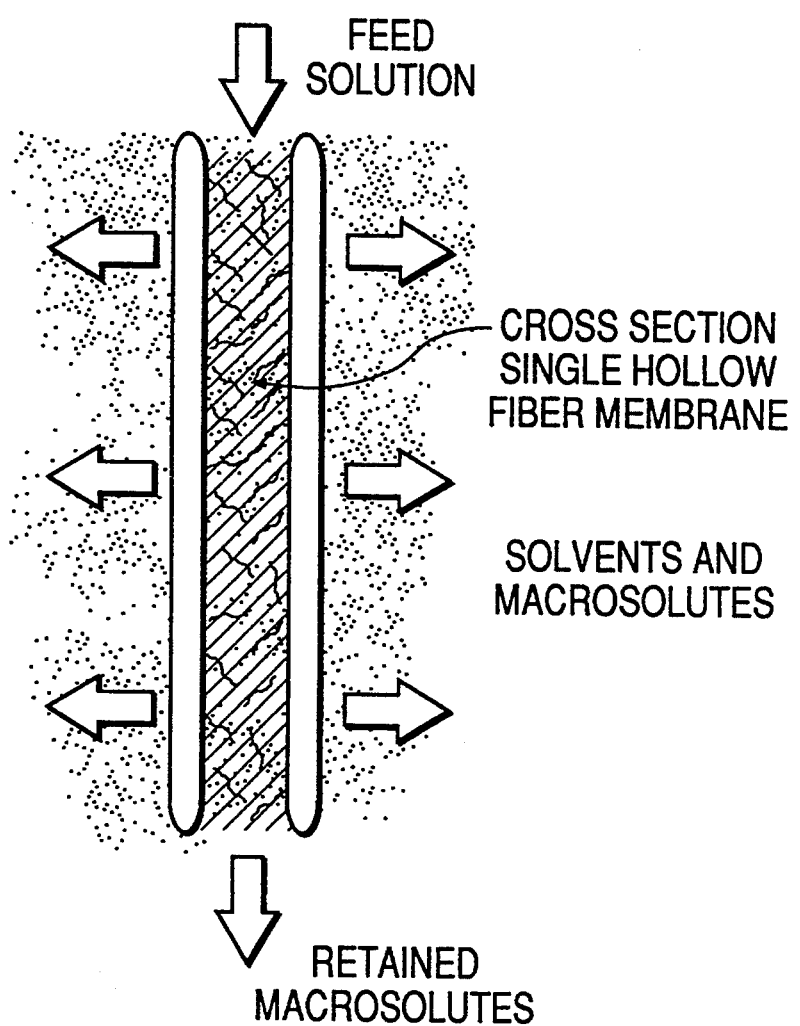
FIG. 1 is an illustration of hollow fiber ultrafiltration.
Figure 2:
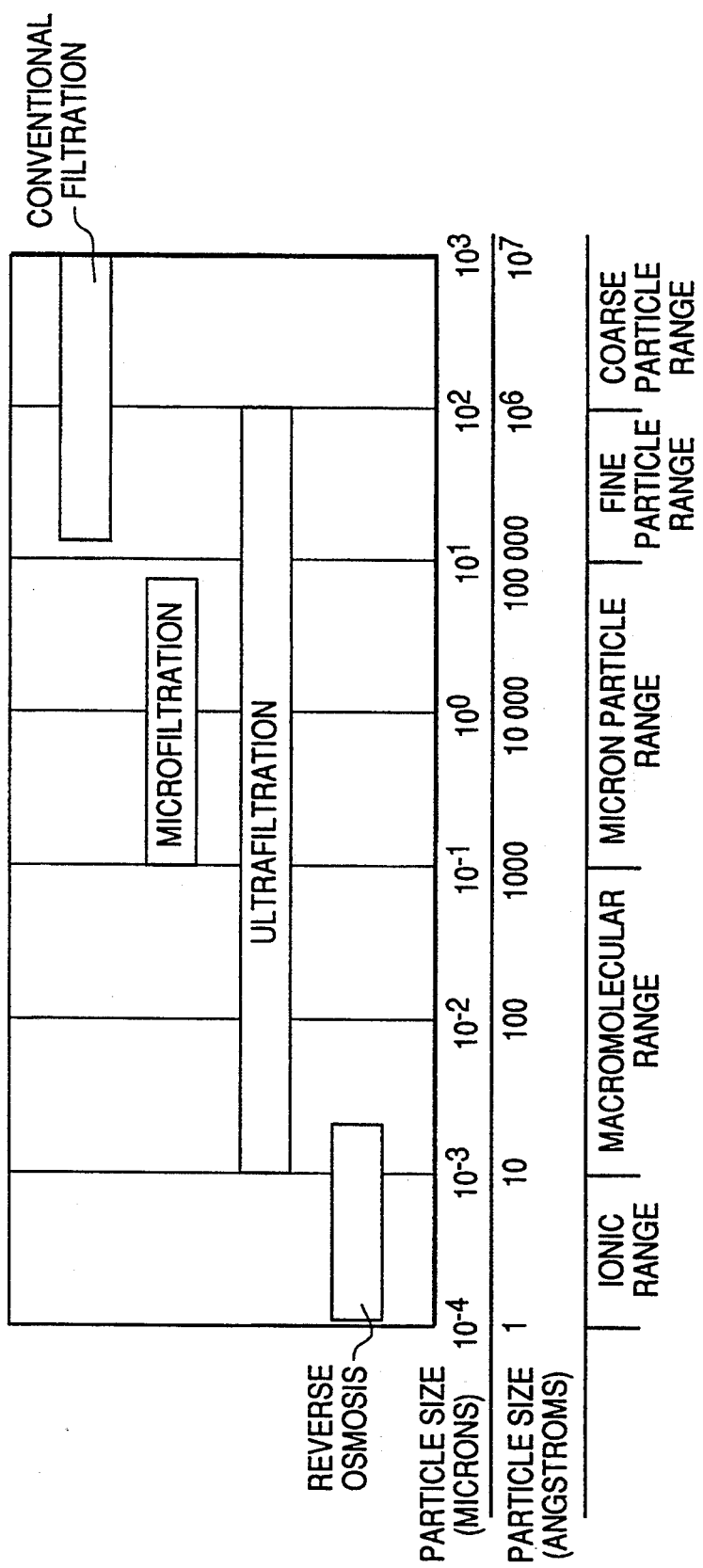
FIG. 2 illustrates membrane separation application based on particle size.

Ultrafiltration is a pressure-activated membrane filtration process capable of performing a variety of selective molecular separations. For a discussion of this technology see Breslau, B. R., "Ultrafiltration, Theory and Practice," paper presented at the 1982 Corn Refiners Association Scientific Conference, Lincolnshire, Ill., Jun. 16–18, 1982, which is incorporated herein by reference. In ultrafiltration, the process fluid flows across a membrane with pore diameters in the range of 10 to 200 Angstroms, as shown in FIG. 1. Solvents and species whose molecular size and weight are below the molecular weight cut-off will permeate through the membrane and emerge as an ultrafiltrate, while rejected species are progressively concentrated in the process stream. Ultrafiltration differs from reverse osmosis in that it employs a more "porous" membrane which will not retain low molecular weight species such as solvent molecules. FIG. 2 illustrates the membrane separation application based on particle size. Ultrafiltration covers the range of $10^{-3}$ to $10^2$ microns.

At the heart of the ROMICON ultrafiltration system is the hollow fiber. These hollow fibers are constructed on non-cellulosic, synthetic polymers. They are anisotropic and have a very tight skin on the internal surface supported by a sponge-like outer structure. The extremely thick wall of the hollow fiber gives it the strength needed for long service. The skin or active membrane is 0.1 microns thick and any species passing through the skin readily passes through the outer structure. Any buildup of foreign matter which occurs, therefore, is solely on the skin and not in the sponge-like outer support.

The self-supporting structure of the hollow fiber enables the use of a backflushing technique to maintain continuous high average flux rates through the fibers. Backflushing forces foreign materials and flux-inhibiting layers from the membrane surface. Because flow occurs on the inside of the hollow fiber under controlled fluid management conditions, high shear forces exist at the membrane surface that minimize concentration polarization by rejected solutes. The rejected solutes are continuously concentrated upstream in the process, while low molecular weight solutes and solvent permeate through the membrane.

The ROMICON TM hollow fibers are housed in a cartridge (shell and tube geometry). Shell and tube geometry refers to a construction whereby the fibers are held within an external cartridge, making possible flow through the fibers or flow around the fibers by feeding fluid into the external cartridge, as explained below. Each cartridge contains two process and two permeate ports. The process ports feed directly to the lumen of the fibers, while the permeate ports feed directly to the cartridge shell. Flow through these ports can be completely controlled and switched from one mode of operation to another. The cartridge can be operated at high temperatures due to the non-cellulosic nature of the ROMICON hollow fiber and in the wide pH range encountered in the preparation of the low optical density materials. In a typical embodiment, the ion exchange resin is treated with a water soluble metal salt, aqueous base and a mild oxidizing agent to convert it to the magnetic form. The material is then collected by filtration, dried and is ready for use as a magnetic pigment. Micronization of the material is unnecessary since it is submicron before and after the treatment. In addition, the material may be dyed directly through its ion exchange properties for color applications by known technology.

Figure 4:
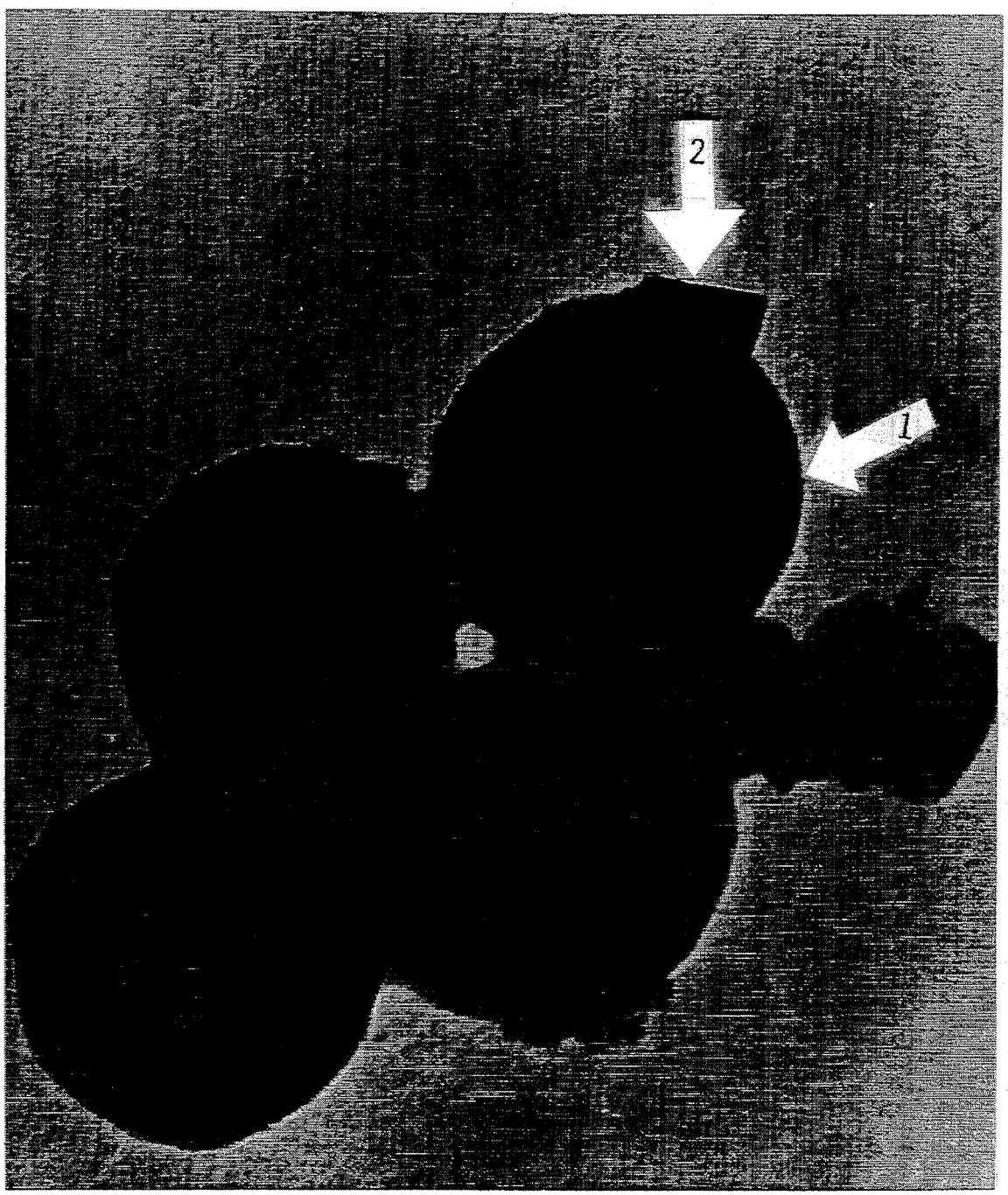
FIG. 4 is a transmission electron micrograph of the SSPR $Fe^{3+}$ resin. Magnification: 660 KX; 1 cm=150 A

FIG. 4 shows a magnetic material containing a resin bead having therein single-domain particles, 1, and having thereon multidomain particles, 2. The multidomain particles provide the retentitivity and coercivity component of the magnetic material while the single-domain particles provide high initial permeability.

The high surface to bulk ratio of exchange sites in the resin allows for a distribution of single-domain and multidomain particles to form in the matrix simultaneously, leading to a magnetic pigment with variable magnetic properties. A range of such distributions is possible such as to allow for a magnetic pigment with high initial permeability, coercivity and remanence.

As such the particles or fluid may be dyed or may coexist with the colloidal suspension of a second constituent which may be colored pigment. Colored pigment may be added to the mix along with the composite to achieve the desired color. In addition, since ion exchange capability is maintained in the composite itself, color may also be introduced directly in the polymer matrix by ion exchanging dyes or other chromophores into the There can be selected as pigments, known magenta, cyan, yellow pigments and mixtures thereof, as well as red, green, or blue pigments, or mixtures thereof, and the like.

Illustrative examples of magenta materials that may be used as pigments, include for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4(octadecyl-sulfonomido) phthalocyanine, X-copper phthalocyanine pigment listed in the Color Index as CI 74160, CI Pigment Blue, and Anthradanthrene Blue X2137, and the like. Illustrative examples of yellow pigments that may be employed include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron yellow SE/GLN, CI dispersed yellow 33, 2,5-dimethoxy-4-sulfonanilide phenylazo-4'-chloro-2,5-dimethoxy acetoacetanilide, permanent yellow FGL, and the like.

Illustrative examples of red materials useful as pigments include, cadmium red 150K, CI pigment red 108; lithol red, CI pigment red 49; lithol scarlet, CI pigment red 4301L; toluidene red, CI pigment red 3; and the like. Examples of green pigments include, chrome green, CI pigment green 15; chrome green lake, CI pigment green 18; chrome intra green, CI pigment green 21; phthalocyanine green, CI pigment green 7; and the like. Examples of blue pigments include, phthalocyanine blue, CI pigment blue 15; prussion blue, CI pigment blue 27; ultramarine blue, CI pigment blue 29, and the like.

The color pigments, namely, red, green, blue, cyan, magenta and yellow pigments are generally present in an amount of from about 1 to about 20% and preferably from about 2 to about 10%. The pigment is introduced through attrition, air attrition, shaking, milling, ball milling or the like. The pigment particle size is selected so that it will not interfere with any of the desired material characteristics. The particles are preferably submicron in size but may be larger depending upon the intended color application. The ability to manipulate the size of the pigment particle to achieve the desired color result would be with the skill of the practitioner in tile art.

Examples of suitable water soluble dyes include Bernacid Red 2BMN, Pontamine Brilliant Bond Blue A, BASF X-34, Pontamine, Food Black 2, Carodirect Turquoise FBL Supra Conc. (Direct Blue 199), available from Carolina Color and Chemical, Special Fast Turquoise 8GL Liquid (Direct Blue 86), available from Mobay Chemical, Intrabond Liquid Turquoise GLL (Direct Blue 86), available from Crompton and Knowles, Cibracron Brilliant Red 38-A (Reactive Red 4), available from Aldrich Chemical, Drimarene Brilliant Red X-2B (Reactive Red 56), available from Pylam, Inc., Levafix Brilliant Red E-4B, available from Mobay Chemical, Levafix Brilliant Red E-6BA, available from Mobay Chemical, Procion Red H8B (Reactive Red 31), available from ICI America, Pylam Certified D&C Red #28 (Acid Red 92), available from Pylam, Direct Brill Pink B Ground Crude, available from Crompton & Knowles, Cartasol Yellow GTF Presscake, available from Sandoz, Inc., Tartrazine Extra Conc. (FD&C Yellow #5, Acid Yellow 23), available from Sandoz, Carodirect Yellow RL (Direct Yellow 86), available from Carolina Color and Chemical, Cartasol Yellow GTF Liquid Special 110, available from Sandoz, Inc., D&C Yellow #10 (Acid Yellow 3), available from Tricon, Yellow Shade 16948, available from Tricon, Basacid Black X34, available from BASF, Carta Black 2GT, available from Sandoz, Inc., Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton- Thiokol), Sevron Blue 5GMF (ICI), Basacid Blue 750 (BASF), Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geigy, Basilen Black P- BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-8B, Intracron Turquoise Blue GE, Intracron Turquoise HA, and Intracron Black RL, available from Crompton and Knowles, Dyes and Chemicals Division, and the like. Dyes that are invisible to the naked eye but detectable when exposed to radiation outside the visible wavelength range (such as ultraviolet or infrared radiation), such as dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benziminazole, derivatives of coumarin, derivatives of pyrazolines containing sulfonic acid groups, 4,4'-bis(-triazin-2-ylamino)stilbene-2,2'-disulfonic acids, 2-(stilben-4-yl)naphthotriazoles, 2-(4-phenylstilben-4-yl)benzoxazoles, 4,4-bis(triazo-2-yl)stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable.

The dye is present in the composition in any effective amount, typically from about 1 to about 20% by weight, and preferably from about 2 to about 10% by weight, although the amount can be outside of this range. As will be recognized by the skilled artisan, the above listing of dyes and pigments are not intended to be limiting. Additional dyes and pigments for use in the present invention are readily recognizable by the skilled artisan.

Figure 5:
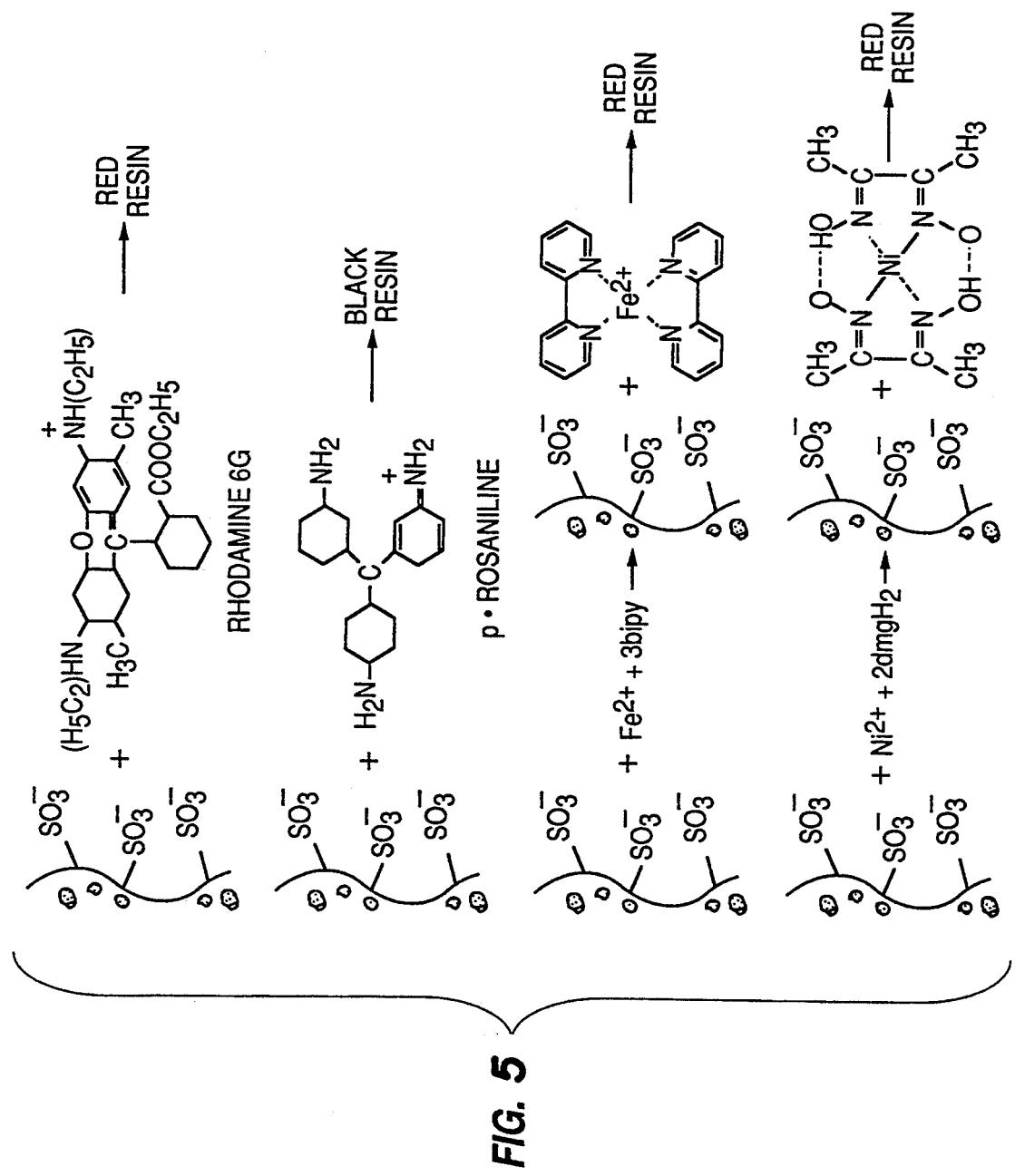
FIG. 5 illustrates direct coloring of the resin matrix.

Since ion exchange capability is maintained in the composite itself, color may also be introduced directly in the polymer matrix by ion exchanging dyes or other chromophores in the resin. Two examples of this approach are illustrated in FIG. 5. The first two direct coloring examples shown in FIG. 5 illustrate ion exchange of cationic dyes to produce red and black resins respectively.

In addition, again using the ion exchange capabilities of the resin, direct coloration can be achieved by the introduction of a metal that can form chromophores with known chelating agents and other chromophore producing materials. The second two direct coloring examples of FIG. 5 illustrate this method of direct precipitation of chromophores in the resin using iron(II) bipyridyl and nickel dimethylglyoxine to form red resins. Direct coloration has been found to be highly efficient and rapid using the micronized form of the composite. Any known dye may be used which is capable of ionic exchange with the resin, as described above. Methods of direct coloration are described in F. Helfferich, "Ion Exchange", McGraw-Hill, New York 1962, and R. Paterson, "An introduction to Ion Exchange", Heyden and Son, Ltd., London, 1970, both of which are incorporated herein by reference.

Colored magnetic particles and fluids prepared as described above are stable toward settling and do not separate color from the magnetic vehicle in an applied magnetic field.

The materials as described herein may be used in liquid development processes. In polarizable liquid development processes, as disclosed in U.S. Pat. No. 3,084,043 (Gundlach), the disclosure of which is totally incorporated herein by reference, liquid developers having relatively low viscosity and low volatility and relatively high electrical conductivity (relatively low volume resistivity) are deposited on a gravure roller to fill the depressions in the roller surface. Excess developer is removed from the lands between the depressions, and as a receiving surface charged in image configuration passes near the gravure roller, liquid developer is attracted from the depressions onto the receiving surface in image configuration by the charged image. Developers and processes of this type are disclosed in, for example, U.S. Pat. Nos. 4,047,943, 4,059,444, 4,822,710, 4,804,601, 4,766,049, Canadian Patent 937,823, Canadian Patent 926,182, Canadian Patent 942,554, British Patent 1,321,286, and British Patent 1,312,844, the disclosures of each of which are totally incorporated herein by reference.

When the liquid developer is intended for use in a polarizable liquid development system, the liquid developer is applied to an applicator such as a gravure roll and brought near an electrostatic latent image. The charged image polarizes the liquid developer in the depressions in the applicator, thereby drawing the developer from the depressions and causing it to flow to the image Bearing member to develop the image. For this application, the liquid vehicle of the liquid developer is somewhat more viscous than is the situation with electrophoretic development, since particle migration within the developer is generally not necessary and since the liquid developer must be sufficiently viscous to remain in the depressions in the applicator prior to development. The viscosity, however, remains significantly lower than that typically observed for many printing inks, since the liquid developer must be capable of being pulled from the depressions in the applicator roll by the force exerted by the electrostatic latent image. Thus, liquid developers for use in polar development systems typically have a viscosity of from about 25 to about 500 centipoise at the operating temperature of the copier or printer, and preferably from about 30 to about 300 centipoise at the machine operating temperature. In addition, liquid developers intended for use in polarizable liquid development systems typically have a resistivity lower than liquid developers employed in electrophoretic or photoelectrophoretic development systems to enable the developer to become polarized upon entering proximity with the electrostatic latent image. The liquid developers of the present invention, however, generally have resistivities that are significantly higher than the resistivities of typical printing inks, for which resistivities generally are substantially less than about $10^9$ ohm-cm. Typically, liquid developers for polarizable liquid development systems have a resistivity of from about $10^8$ to about $10^{11}$ ohm-cm, and preferably from about $10^9$ to about $10^{10}$ ohm-cm.

Liquid developers generally comprise a liquid vehicle, a charge control additive, and a colorant. The liquid medium may be any of several hydrocarbon liquids conventionally employed for liquid development processes, such as hydrocarbons, including high purity alkanes having from about 6 to about 14 carbon atoms, such as Norpar® 12, Norpar® 13, and Norpar® 15, available from Exxon Corporation, and including isoparaffinic hydrocarbons such as Isopar ® G, H, L, and M, available from Exxon Corporation, Amsco ® 460 Solvent, Amsco ® OMS, available from American Mineral Spirits Company, Soltrol ®, available from Phillips Petroleum Company, Pagasol ®, available from Mobil Oil Corporation, Shellsol ®, available from Shell Oil Company, and the like. Isoparaffinic hydrocarbons are preferred liquid media, since they are colorless, environmentally safe, and possess a sufficiently high vapor pressure so that a thin film of the liquid evaporates from the contacting surface within seconds at ambient temperatures. Generally, the liquid medium is present in a large amount in the developer composition, and constitutes that percentage by weight of the developer not accounted for by the other components. The liquid medium is usually present in an amount of from about 80 to about 98 percent by weight, although this amount may vary from this range.

The liquid developers of the present invention can also include a charge control agent. Examples of suitable charge control agents for liquid developers include the lithium, cadmium, calcium, manganese, magnesium and zinc salts of heptanoic acid; the barium, aluminum, cobalt, manganese, zinc, cerium and zirconium salts of 2-ethyl hexanoic acid, (these are known as metal octoates); the barium, aluminum, zinc, copper, lead and iron salts of stearic acid; the calcium, copper, manganese, nickel, zinc and iron salts of naphthenic acid; and ammonium lauryl sulfate, sodium dihexyl sulfosuccinate, sodium dioctyl sulfosuccinate, aluminum diisopropyl salicylate, aluminum resinate, aluminum salt of 3,5 di-t-butyl gamma resorcylic acid. Mixtures of these materials may also be used. Particularly preferred charge control agents include lecithin (Fisher Inc.); OLOA 1200, a polyisobutylene succinimide available from Chevron Chemical Company; basic barium petronate (Witco Inc.); zirconium octoate (Nuodex); aluminum stearate; salts of calcium, manganese, magnesium and zinc with heptanoic acid; salts of barium, aluminum, cobalt, manganese, zinc, cerium, and zirconium octoates; salts of barium, aluminum, zinc, copper, lead, and iron with stearic acid; iron naphthenate; and the like, as well as mixtures thereof. The charge control additive may be present in any effective amount, typically from about 0.001 to about 3 percent by weight, and preferably from about 0.01 to about 0.8 percent by weight of the developer composition, although the amount can be outside this range. Other additives, such as charge adjuvants added to improve charging characteristics of the developer, may be added to the developers of the present invention, provided that the objectives of the present invention are achieved. Charge adjuvants such as stearates, metallic soap additives, polybutylene succinimides, and the like are described in references such as U.S. Pat. Nos. 4,707,429, 4,702,984, and 4,702,985, the disclosures of each of which are totally incorporated herein by reference.

The liquid developers of the present invention contain toner particles or colored toner particles in a liquid vehicle as described above. For example, the toner particles can consist solely of pigment particles dispersed in the liquid vehicle. Since the liquid vehicle is cured to a solid before, or after transfer, the pigment particles can become affixed to the print substrate by the cured liquid vehicle, and no additional polymeric component is required in the developer for fixing purposes. If desired, however, a polymeric component can be present in the developer. The polymer can be soluble in the liquid vehicle, and can include polymers such as poly(2-ethyl hexylmethacrylate); poly(isobutylene-co-isoprenes), such as Kalene 800, available from Hardman Company, New Jersey; polyvinyl toluene-based copolymers, including vinyl toluene acrylic copolymers such as Pliolite OMS, Pliolite AC, Pliolite AC-L, Pliolite FSA, Pliolite FSB, Pliolite FSD, Pliolite FSE, Pliolite VT, Pliolite VT-L, Pliolite VTAC, and Pliolite VTAC-L, available from the Goodyear Tire and Rubber Company, Neocryl S-1002 and EX519, available from Polyvinyl Chemistry Industries, Parapol 900, Parapol 1300, and Parapol 2200, available from Exxon Company, and the like; block copolymers such as poly(styrene-b-hydrogenated butadiene), including Kraton G 1701, available from Shell Chemical Company; and the like, as well as mixtures thereof, as disclosed in, for example, copending application U.S. Ser. No. 07/369,003, the disclosure of which is totally incorporated herein by reference. In addition, the polymer can be insoluble in the liquid vehicle, and can be present either as separate particles or as an encapsulating shell around the pigment particles. Examples of suitable polymers in this instance include ethylene-vinyl acetate copolymers such as the Elvax ® I resins available from E. I. Du Pont de Nemours & Company, copolymers of ethylene and an -ethylenically unsaturated acid selected from acrylic or methacrylic acid, where the acid moiety is present in an amount of from 0.1 to 20 percent by weight, such as the Nucrel ® II resins available from E. I. Du Pont de Nemours & Company, polybutyl terephthalates, ethylene ethyl acrylate copolymers such as those available as Bakelite DPD 6169, DPDA 6182 Natural, and DTDA 9169 Natural from Union Carbide Company, ethylene vinyl acetate resins such as DQDA 6479 Natural 7 and DQDA 6832 Natural 7 available from Union Carbide Company, methacrylate resins such as polybutyl methacrylate, polyethyl methacrylate, and polymethyl methacrylate, available under the trade name Elvacite from E. I. Du Pont de Nemours & Company, and others as disclosed in, for example, British Patent 2,169,416 and U.S. Pat. No. 4,794,651, the disclosures of which are totally incorporated herein by reference. Further, the polymer can be partially soluble in the liquid vehicle, or soluble in the vehicle at elevated temperatures of, for example, over 75° C. and insoluble at ambient temperatures of, for example, from about 10° C. to about 65° C. Examples of suitable polymers in this instance include polyolefins and halogenated polyolefins, such as chlorinated polypropylenes and poly-olefins, including polyhexadecenes, polyoctadecenes, and the like, as disclosed in copending application U.S. Ser. No. 07/300,395, the disclosure of which is totally incorporated herein by reference.

Polymeric components of the solids portion of the developers, when present, are present in any amount up to about 95 percent by weight of the solids component of the liquid developers of the instant invention.

The liquid developers of the present invention can also contain various polymers added to modify the viscosity of the developer or to modify the mechanical properties of the developed or cured image such as adhesion or cohesion. Examples of suitable viscosity controlling agents include thickeners such as alkylated polyvinyl pyrrolidones, such as Ganex V216, available from GAF; polyisobutylenes such as Vistanex, available from Exxon Corporation, Kalene 800, available from Hardman Company, New Jersey, ECA 4600, available from Paramins, Ontario, and the like; Kraton G-1701, a block copolymer of polystyrene-b-hydrogenated butadiene available from Shell Chemical Company, Polypale Ester 10, a glycol rosin ester available from Hercules Powder Company; and other similar thickeners. In addition, additives such as pigments, including silica pigments such as Aerosil 200, Aerosil 300, and the like available from Degussa, Bentone 500, a treated montmorillonite clay available from NL Products, and the like can be included to achieve the desired developer viscosity. Additives are present in any effective amount, typically from about 1 to about 40 percent by weight in the case of thickeners and from about 0.5 to about 5 percent by weight in the case of pigments and other particulate additives.

In addition, liquid developers of the present invention can also contain conductivity enhancing agents. For example, the developers can contain additives such as quaternary ammonium compounds as disclosed in, for example, U.S. Pat. No. 4,059,444, the disclosure of which is totally incorporated herein by reference.

The liquid developers of the present invention generally can be prepared by any method suitable for the type of toner particle selected. For example, the developer can be prepared by heating and mixing the ingredients, followed by grinding the mixture in an attritor until homogeneity of the mixture has been achieved.

Methods of preparing various kinds of liquid developers are disclosed in U.S. Pat. No. 4,476,210, 4,794,651, 4,877,698, 4,880,720, 4,880,432, and copending applications U.S. Ser. No. 07/369,003 and U.S. Ser. No. 07/300,395, incorporated herein by reference. The charge control agent can be added to the mixture either during mixing of the other ingredients or after the developer has been prepared.

In general, images are developed with the liquid developers of the present invention by generating an electrostatic latent image and contacting the latent image with the liquid developer, thereby causing the image to be developed. When a liquid developer of the present invention suitable for polarizable liquid development processes is employed, the process entails generating an electrostatic latent image on an imaging member, applying the liquid developer to an applicator, and bringing the applicator into sufficient proximity with the latent image to cause the image to attract the developer onto the imaging member, thereby developing the image. Developers and processes of this type are disclosed in, for example, U.S. Pat. No. 4,047,943, 4,059,444, 4,822,710, 4,804,601, 4,766,049, 4,686,936, 4,764,446, Canadian Patent 937,823, Canadian Patent 926,182, Canadian Patent 942,554, British Patent 1,321,286, and British Patent 1,312,844, the disclosures of each of which are totally incorporated herein by reference. Any suitable means can be employed to generate the image. For example, a photosensitive imaging member can be exposed by incident light or by laser to generate a latent image on the member, followed by development of the image and transfer to a substrate such as paper, transparency material, cloth, or the like. In addition, an image can be generated on a dielectric imaging member by electrographic or ionographic processes as disclosed, for example, in U.S. Pat. No. 3,564,556, 3,611,419, 4,240,084, 4,569,584, 2,919,171, 4,524,371, 4,619,515, 4,463,363, 4,254,424, 4,538,163, 4,409,604, 4,408,214, 4,365,549, 4,267,556, 4,160,257, 4,485,982, 4,731,622, 3,701,464, and 4,155,093, the disclosures of each of which are totally incorporated herein by reference, followed by development of the image and, if desired, transfer to a substrate. If necessary, transferred images can be fused to the substrate by any suitable means, such as by heat, pressure, exposure to solvent vapor or to sensitizing radiation such as ultraviolet light or the like as well as combinations thereof. Further, the liquid developers of the present invention can be employed to develop electrographic images wherein an electrostatic image is generated directly onto a substrate by electrographic or ionographic processes and then developed, with no subsequent transfer of the developed image to an additional substrate.

The magnetic nanoscale materials prepared and disclosed in the invention may be incorporated into the liquid development compositions by mixing, and grinding if necessary, or by other known methods of incorporation, as disclosed in U.S. Pat. No. 4,760,009 to Larson. This may be by milling, attrition and the like. The images thus produced after incorporation and imaging, are of high resolution with low background and may be magnetic, colored or magnetic and colored.

The materials of the present invention may also be incorporated in toner for use in compositions for developing latent electrostatic images as disclosed in U.S. Pat. No. 5,047,307 to Landa et al. Thus a magnetic-electrostatic toner composition may be prepared.

The materials as described herein may be used in liquid ink compositions, such as in ink jet applications, for example, as disclosed in U.S. Pat. No. 5,114,477 to Mort et al. which is hereby incorporated by reference. The materials of the invention may be incorporated as described in Examples 2 and 3 below. The images thus produced may be magnetic, colored or magnetic and colored.

The materials as described herein may also be used in the formation of continuous films, surface coatings, thick films and free-standing films. Such films may be formed on any known substrate, for example glass, metal, selenium, silicon, quartz, fabric, fibers, paper and the like. Methods of forming these films preferably include evaporation, spin coating, dip coating, extrusion coating, gravure coating, roll coating, cast coating, brush coating, calender coating, meniscus coating, powdered resin coating, spray coating, electrostatic spray coating and by draw bar. Any known method of coating is acceptable. Examples of various coating methods may be found, for example in G. L. Booth, "Coating Equipment and Processes" Lockwood Publishing, New York, 1970; the Kirk-Othmer Encyclopedia of Chemical Technology, 3rd. ed., Wiley-Interscience, New York, 1979; and in "Ullmann's Encyclopedia of Industrial Chemistry," VCH Publishers, New York, 1991. Furthermore, the material of the invention may be mixed or otherwise added to known film forming materials such as polymers, plastics and the like to cast or produce films containing the material of the invention. Films formed from the material of the invention include for example mechanical, magnetic, optical or electronic device applications.

The following examples are illustrative.

EXAMPLE 1

Iron (III)-SSPR $Fe^{3+}$

Three hundred and seventy five grams of $FeCl_3.6H_2O$ were dissolved in 1.5 liters of deionized water and added to 1 liter of SSPR resin diluted to 2.5 liters. The suspension was stirred for 1 hour then diluted to 5 liters and added to the holding tank of the LAB-5 system. The ROMICON TM Model HF-LAB-5 is a single cartridge hollow fiber ultrafiltration system for the concentration or separation of laboratory and industrial fluid streams.

Diafiltration was begun to wash the suspension free of excess iron and hydrogen chlorides. Approximately 60 liters of tap water were used for the wash which took approximately 2 hours. After the wash, the suspension was recovered as a 5 liter sample and appeared dark tan in color indicating that exchange had taken place.

After a successful test run on 30 mls of sample, the full 5 liter sample was divided equally among two 4 liter beakers and heated to 80 C. 25 g of NaOH dissolved in 120 mls of deionized water were added to each beaker along with 27 mls of 95% $N_2H_4$.

Stirring and heating were continued for 1 hour during which time the suspension changed from tan to black with bubbling. The contents of each beaker was diluted to 3.5 liters with tap water whereupon the pH changed from 13 to 12. The suspension was placed in the LAB-5 system and washed for 1 hour to neutral pH with 50 liters of tap water. The suspension was concentrated to 4.5 liters and drained from the LAB-5 system. Most of the resin remained in suspension although some settling was observed. A small amount of the resin was obtained by centrifuging a 400 ml sample followed by decanting and was used for testing after drying at 100 C. overnight. Centrifugation of the resin is feasible after the first loading due to the increased density of the resin.

During diafiltration, the LAB-5 system was operated with 25 psi at the inlet port and 5 to 7 psi at the outlet to maintain a pressure differential across the membrane of about 20 psi. The inlet and outlet pressure and the permeate volume were measured as a function of time during the processing as a check on the flux rate of the membrane which was found to be about 76 gal/sq. ft./day. After use, the apparatus was rinsed with 0.5% NaOH using the standard cleaning procedure as described at pages 11-15 of "ROMICON TM Model HF-LAB-5 Ultrafiltration System with Reverse Flow," Operating Instruction Manual, Romicon, Inc., Woburn, Massachusetts 01801.

The SSPR $Fe^{3+}$ (Low optical density magnetic material loaded with an $Fe^{+3}$ ion) dries to a black glossy mass which is easily crushed to smaller agglomerates composed of the submicron resin beads. Examination of the sample at 70× shows a good optical quality low optical density material which is reddish in color by transmitted light and which resembles the large-bead $Fe^{2+}$ (low optical density magnetic material loaded with an $Fe^{+2}$ ion) material more than it resembles the large-bead $Fe^{3+}$ material.

Figure 3:
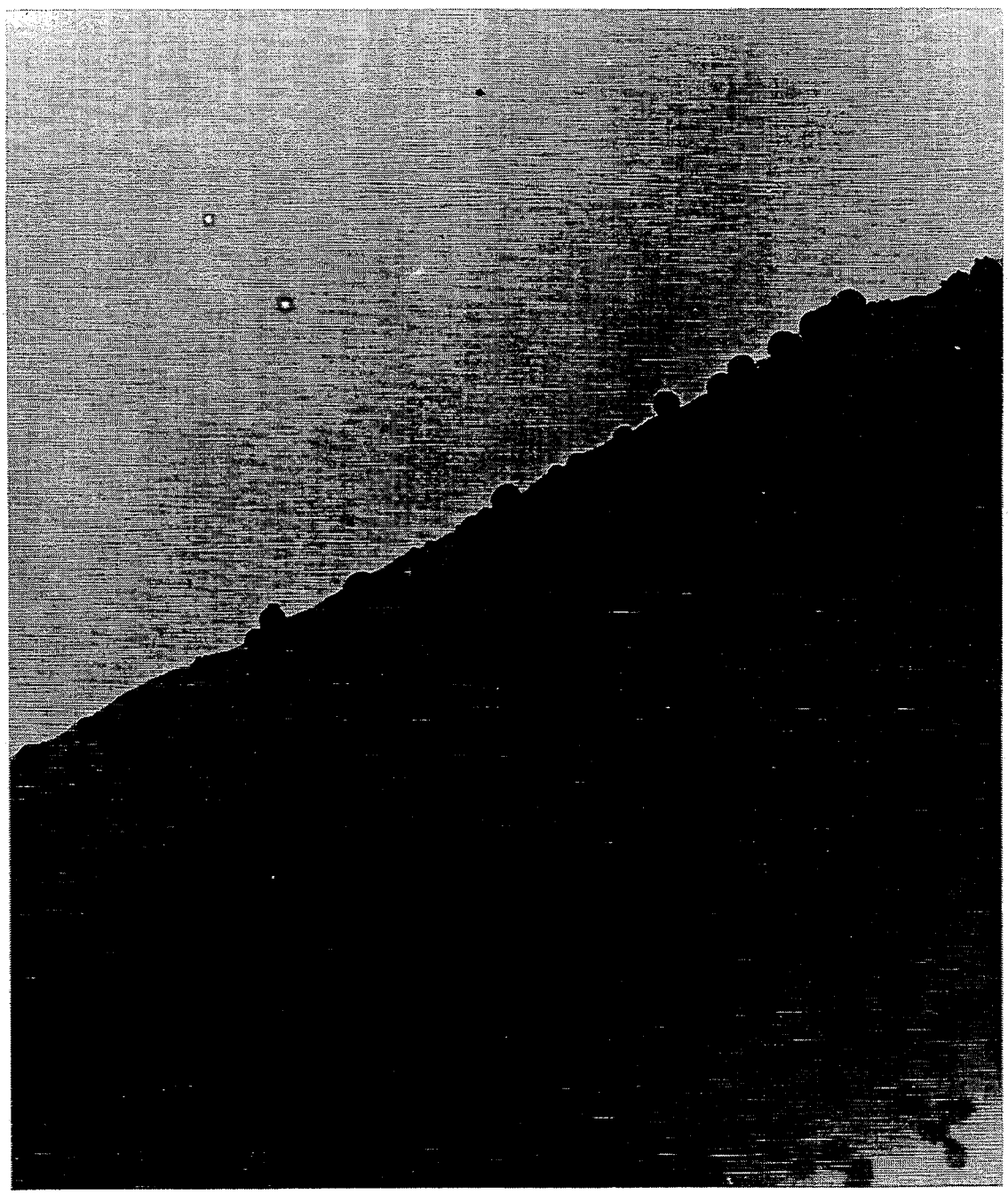
FIG. 3 is a transmission electron micrograph of the SSPR $Fe^{3+}$ resin. Magnification: 50 KX; 1 cm=200 nm.

The SSPR $Fe^{3+}$ sample is two-component as shown in the electron micrograph in FIG. 3. The first component consists of individual submicron particles of resin beads with diameters the same as those measured by SEM analysis before loading the sample. The second component consists of individual crystallites ranging in size from 75 to 250 Angstroms. The latter appear identical to the $(\gamma)$-$Fe_2O_3$ particles dispersed in the large-bead $Fe^{2+}$ material.

A TEM analysis of the resin beads at 200 KX showed a dispersion of crystalline particles less than 50 Å in diameter. Resolution of the particles internal to the beads was obtained at 660 KX using a Phillips EM400T electron microscope. A TEM photograph of four beads is shown in FIG. 4. The internal crystallites are approximately 15 Å in diameter and are dispersed relatively uniformly throughout the resin.

Energy dispersive X-ray analysis (EDAX) of the sample shows that both components contain iron. The X-ray diffractogram of the sample is consistent with that of $(\gamma)$-$Fe_2O_3$. Analysis of the resin after conversion to the gamma form gave 8.3% iron, indicating that no loss or iron occurred during conversion. This figure is close to the 5.1 meq/dry g nominal capacity of the resin, where 8.7% iron is expected. In the present sample, the external crystallites dominate the optical properties of the SSPR $Fe^{3+}$ resin which contains particles of approximately the same size, shape and composition as the large-bead $Fe^{2+}$ material which it resembles.

The magnetic saturation moment of the sample after the first loading was 7.2 emu/g. The magnetic saturation moments of these materials is usually less than that expected from the iron content of the resin, assuming complete conversion to the gamma form due to small-particle magnetic effects. In the present case the very small internal crystallites may add to or subtract from the moment of the resin depending on the distribution of surface spins.

The magnetic hysteresis curve for the sample is similar to those obtained for the large-bead $Fe^{2+}$ materials containing $(\gamma)$-$Fe_2O_3$ crystallites in the 250 Å range. A net coercive force of 81 Oe is observed and is consistent with the size of the external crystallites. The magnetic remanence of the sample was 10 Maxwells. Clearly, in the present sample, the external crystallites dominate the magnetic and optical properties of the SSPR $Fe^{3+}$ resin. Controlling the distribution of single-domain to multidomain particles allows fine-tuning of the magnetic properties of the resin. Thus, a material having a net coercive force and a high initial permeability due to the superparamagnetic contribution of the single-domain particles is possible.

EXAMPLE 2

An ink composition comprising 2.5 percent by weight of the magnetic material produced in Example 1, 15 percent by weight of cyclohexyl pyrrolidone (obtained from GAF Corporation, Wayne, N.J.), 1 percent by weight of sodium lauryl sulfate (obtained from Fisher Scientific, Fair Lawn, N.J.), and 81.5 percent by weight of toluene was prepared by mixing together the ingredients at room temperature, 25° C., stirring to obtain a homogeneous solution, and filtering. The ink thus prepared can be incorporated into a thermal ink jet test fixture. It is believed that images of excellent resolution with no substantial background deposits can be obtained. The images thus produced are magnetic and may be colored by incorporating dyes or pigments as described in the above specification and FIG. 7.

Two additional inks can be prepared, said inks being of the same composition as above, except that one contained 0.1 percent by weight of CARBOWAX M20 TM (a polyethylene oxide/bisphenol-A polymer with a molecular weight of 18,000 (obtained from Union Carbide Corporation, Danbury, Conn.)), and 2.4 percent by weight of the fullerene, and the second ink contained 0.3 percent by weight of CARBOWAX M20 TM and 2.2 percent by weight of the fullerene. The CARBOWAX M20 TM is added to the ink at room temperature and the resulting mixture is stirred for about 5 minutes to obtain a homogeneous solution.

EXAMPLE 7

An ink composition comprising 2.5 percent by weight of the magnetic material of Example 1, 15 percent by weight of ethylene glycol, 0.3 percent by weight of CARBOWAX M20 ™, and 82.2 percent by weight of water was prepared by mixing together the ingredients at room temperature, stirring for about 10 minutes to obtain a homogeneous solution, and filtering. The ink thus prepared was incorporated into a jetting test fixture. It is believed that images of excellent resolution with no substantial background deposits can be obtained. The images thus produced are magnetic and may be colored by incorporating dyes or pigments as described in the above specification and FIG. 5.

Other embodiments of the invention will be apparent to those skilled in the art from consideration of the specification and practice of the invention disclosed herein. It is intended that the specification and examples be considered exemplary only, with a true scope and spirit of the invention being indicated by the following claims.

We claim:

1. A magnetic material comprising
    a submicron ion exchange resin bead containing both single-domain and multidomain crystallites of magnetic material.

2. The material according to claim 1, wherein the single-domain crystallites are inside the resin bead and the multidomain crystallites are outside the resin bead.

3. The material according to claim 1, wherein the magnetic material comprises $Fe_2O_3$.

4. The material according to claim 1, wherein the magnetic material has the tunable magnetic properties of initial permeability, and remanence and coercivity.

5. The material according to claim 1, further comprising a color component selected from a colloidal suspension of a colored pigment or dye, or an ion exchange dye or a chromophore.

6. A method of making a magnetic material having both single-domain and multidomain particles comprising the steps of:
    providing a submicron ion exchange resin matrix,
    loading said resin matrix by ultrafiltration with a magnetic
    precipitating single-domain particles within the resin and precipitating multidomain particles outside the resin.

7. The method according to claim 6, wherein the particles comprise $Fe_2O_3$ particles.

8. The method according to claim 6, further comprising introducing a color component selected from a colloidal suspension of a colored pigment or dye, or an ion exchange dye or a chromophore.

9. A magnetic material produced according to the process of claim 6.

10. A method of making a magnetic fluid material having both single-domain and multidomain particles comprising the steps of:
    providing a colloidal suspension of submicron ion exchange resin matrix,
    loading said resin matrix by ultrafiltration with a magnetic ion,
    precipitating single-domain particles within said resin and precipitating multidomain particles outside of said resin to form a stable colloidal dispersion of said resin and particles.

11. The method according to claim 10, wherein the particles comprise $Fe_2O_3$ particles.

12. The method according to claim 10, further comprising introducing a color component selected from a colloidal suspension of a colored pigment or dye, or an ion exchange dye or a chromophore.

13. A magnetic material produced according to the process of claim 10.

* * * * *